United States Patent [19]

Kabanov et al.

[11] 3,958,472

[45] May 25, 1976

[54] APPARATUS FOR CUTTING OUT PREDETERMINED SHAPES

[76] Inventors: Nikolai Pavlovich Kabanov, Naberezhnaya Shevchenko, 3, korpus 3, kv. 50; Vitaly Sergeevich Schukin, Leninsky prospekt, 72, kv. 500, both of Moscow; Vladimir Nikolaevich Suvorov, ulitsa Shkolnaya, 2, kv. 6, Bor Gorkovskoi oblasti; Dmitry Nikolaevich Savonichev, ulitsa Shkolnaya, 4, kv. 8, Bor Gorkovskoi oblasti; Dmitry Nikolaevich Shepelev, ulitsa Mayakovskogo, 1, kv. 3, Bor Gorkovskoi oblasti; Vladimir Pavlovich Chalov, ulitsa Mira, 3, kv. 2, Bor Gorkovskoi oblasti, all of U.S.S.R.

[22] Filed: Dec. 30, 1974

[21] Appl. No.: 537,453

[52] U.S. Cl. ............................. 83/6; 33/27 K; 83/251; 83/565
[51] Int. Cl.² ..................... B26D 3/08; C03B 33/04
[58] Field of Search ...................... 83/6–12, 83/251, 565; 225/96, 96.5, 2; 33/27 K, 32 F

[56] References Cited
UNITED STATES PATENTS

| | | | |
|---|---|---|---|
| 2,746,153 | 5/1956 | Kuntz | 33/27 K |
| 3,026,617 | 3/1962 | Jendrisak | 33/27 K |
| 3,537,345 | 11/1970 | Luppino | 83/565 X |
| 3,797,340 | 3/1974 | Pereman | 83/565 X |

*Primary Examiner*—Frank T. Yost
*Attorney, Agent, or Firm*—Robert E. Burns; Emmanuel J. Lobato; Bruce L. Adams

[57] ABSTRACT

In the hitherto known apparatus of a similar kind the table adapted to support thereon a shape being cut out is mounted on a base for motion solely in a vertical direction.

A characteristic feature of an apparatus in accordance with the invention is that the table for accommodation thereon of the shape being cut out is mounted on a base for longitudinal motion relative to the parallel sides of a template equidistant from the contour of the shape being cut out, in opposite directions, the drive of the table, effecting longitudinal motion of the table, being electrically connected with means providing for energization of this drive successively for, first, forward motion of this table and, second, return motion thereof, depending on the position of the cutting head relative to the parallel sides of the template.

Because of the herein disclosed structure of the apparatus, the latter has been made capable of cutting out the said shapes, alternatingly with elongation and curtailing thereof, which is of paramount importance in case of cutting out blanks for front and rear panoramic windows for automotive vehicles.

3 Claims, 4 Drawing Figures

APPARATUS FOR CUTTING OUT PREDETERMINED SHAPES

The present invention relates to apparatus for cutting out planar shapes having at least two parallel sides. More particularly, the present invention relates to cutting out sheet glass blanks for production of front and rear panoramic windows for automotive vehicles, which are to be curved longitudinally. It is commonly known that such windows are manufactured, as a rule, by pasting up together either two or, in some rare cases, three sheet blanks of which one is to provide the external surface of the panoramic window and another one is to provide the internal surface thereof, facing inside the vehicle. One of the blanks, i.e. the one which is to provide the external surface of the panoramic window is to have a slightly greater length than the other one, for the face edges of the two blanks to coincide as they are superimposed.

The existing technological patterns of production of panoramic windows require either simultaneous or successive cutting out of blanks of the two respective lengths.

There are widely known and employed apparatus for cutting out sheet glass blanks for manufacture of panoramic windows, including a support table adapted to support thereon a glass sheet from which a blank for a panoramic window is to be cut out, a cutting head arranged above this support table and a template of which the outline is equidistant from the contour of the blank to be cut out.

A blank is cut out by the cutting head being driven to follow the template relative to the glass sheet which is held stationary. A major drawback of the above specified known apparatus is that each apparatus in an adjusted state thereof is capable of cutting out a sheet glass blank of one particular length. To produce blanks of different lengths, there are to be used, respectively, either two or three such apparatus at the same time, each apparatus being set to produce sheet blanks of a single predetermined length. This, in its turn, requires additional labour, costs and production floor space.

Besides, there are also known apparatus employed for the same purpose, wherein instead of the support table there is used a system of driven support rollers effecting feeding of a glass sheet from which a blank is to be cut out toward the cutting mechanism and delivering a cut-out blank from the cutting mechanism for subsequent treatment. However, apparatus of this last-mentioned kind are not free from the above-specified drawback.

It is, therefore, the main object of the present invention to create an apparatus for cutting out predetermined shapes having at least two parallel sides, which should offer easy adjustment of the length of the blanks being cut out, whenever required, and thus should be suitable for cutting out blanks of different lengths.

Thus, it is a practical object of the present invention to provide for saving labour and production floor space.

Other objects and advantages of the present invention will be made apparent in the disclosure to follow hereinbelow.

These objects are attained in an apparatus for cutting out predetermined shapes having at least two substantially parallel sides, including a support table adapted to accommodate thereon a sheet from which a blank is to be cut out and a cutting head arranged above this table and adapted to follow a template having an outline equidistant from the contour of the shape to be cut off, in which apparatus, in accordance with the invention, the table is mounted on a base for longitudinal motion relative to the parallel sides of the template, there being provided a drive for effecting the said motion of the table in opposing directions and means for energization of this drive successively in the forward and reverse direction of the travel of said table, depending on the position of the cutting head with respect to the said parallel sides of the template.

An apparatus of the herein disclosed structure is capable of effecting motion of the sheet from which a blank is being cut out during a cutting-out operation, in a direction providing for either elongation or curtailing of the blank, whichever is required.

According to an embodiment of the invention, the means for energization of the drive of the table to effect the motion thereof in the opposite directions includes at least one pickup capable of producing a signal for energization of this drive, depending on the position of the cutting head with respect to the parallel sides of the template, the pickup being connected to the drive of the table through a flip-flop circuit with a binary input.

Also according to an embodiment of the present invention the sheet-accommodating table is capable of moving in opposite directions relative to the base structure thereof and, consequently relative to the parallel sides of the template, owing to the table support structure including axles extending transversely of the base structure and supported thereby, the axles supporting adjacent to the ends thereof eccentric studs having mounted thereon bearing means supporting the said table.

With the table having the above structure, its raising and lowering can be effected by mounting the above-said table-supporting axles on the base structure by means of bell cranks rotatable in a vertical plane, each bell crank having one extremity thereof pivotally supporting thereon the respective axle and the other extremity thereof connected through a rod with an actuator capable of effecting rotation of the bell cranks to either raise or lower the table-supporting axles.

According to an embodiment of the invention, the drive effecting the longitudinal motion of the table includes a double-action fluid cylinder having one end thereof connected to the table and the other end thereof pivotally connected with the table-supporting axle.

Given hereinbelow is a detailed description of an embodiment of the invention, with reference being had to the accompanying drawings, wherein.

The herein disclosed apparatus will be further described in connection with an embodiment thereof incorporable in production of curving panoramic windows for automotive vehicles, manufactured by passing together of two sheet glass blanks.

The apparatus performs alternating cutting out sheet glass blanks, respectively, elongated and curtailed, the difference in their length being from 3 to 5 mm.

Figure 1:
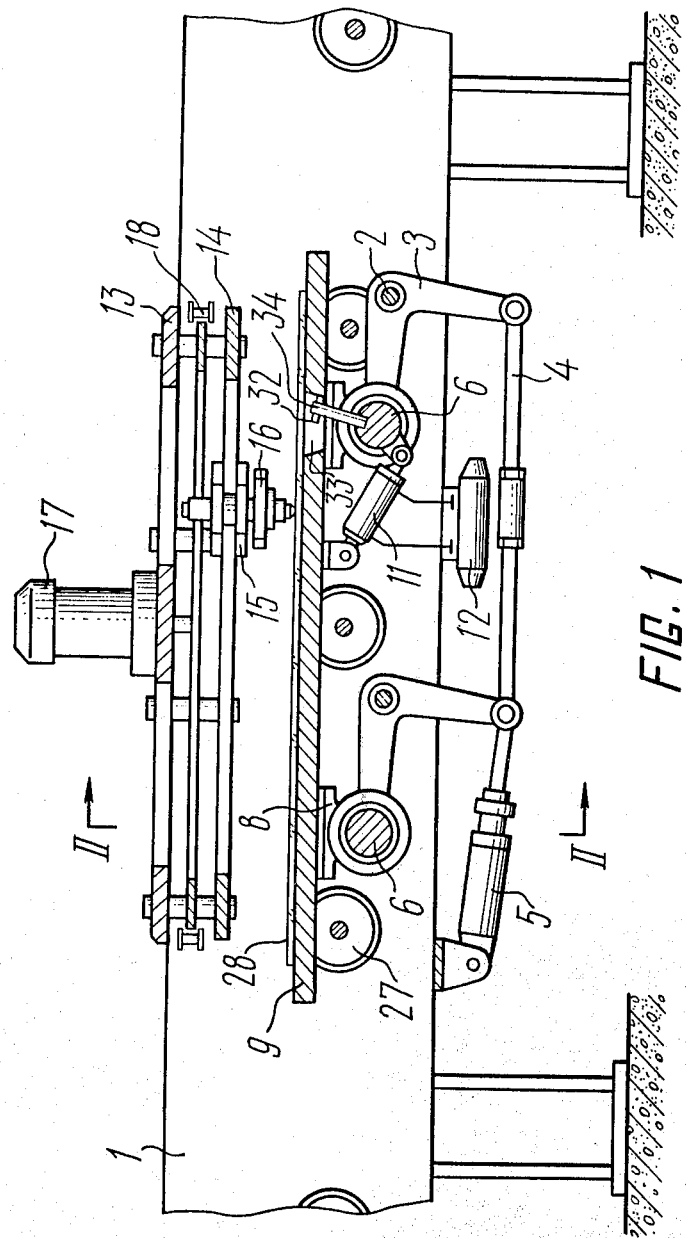
FIG. 1 is a longitudinally sectional view of an apparatus for cutting out predetermined shapes having two parallel sides from glass sheets, embodying the invention.
Figure 2:
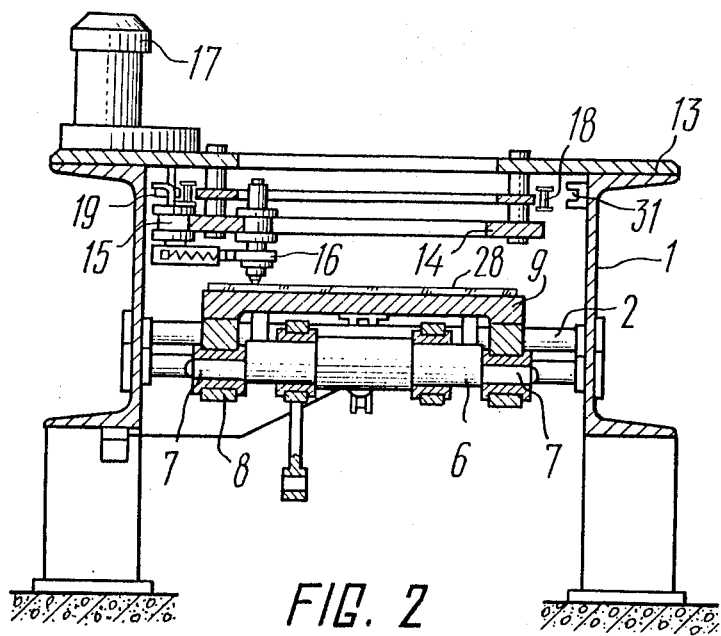
FIG. 2 is a sectional view taken on line II—II in FIG. 1.
Figure 3:
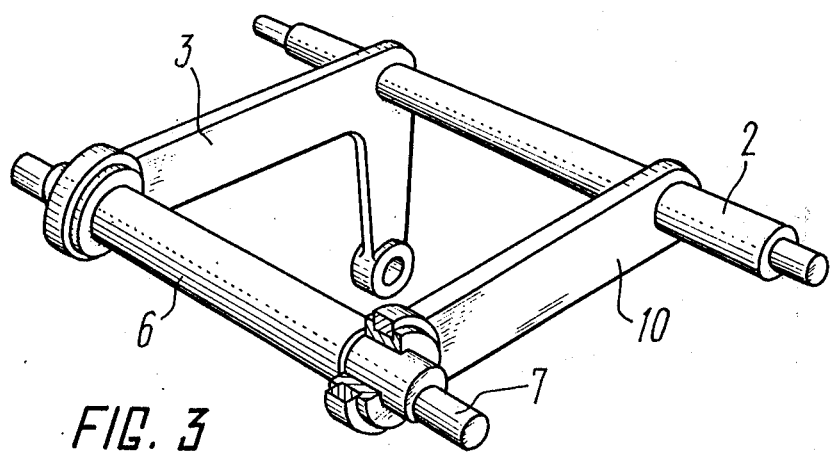
FIG. 3 is an enlarged perspective view of one of the two table suspension assemblies.
Figure 4:
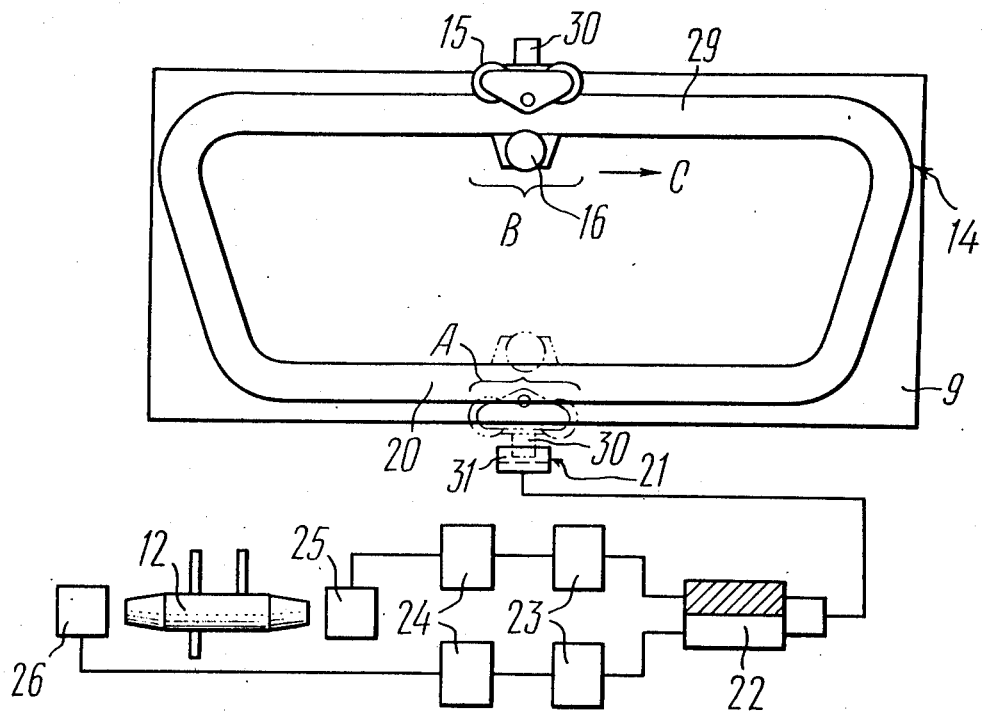
FIG. 4 is a schematic plan view of the apparatus embodying the invention, associated with a means for energization of the drive effecting longitudinal reciprocation of the table, depending on the position of the cutting head with respect to the template.

The apparatus includes a base structure 1 (FIGS. 1 and 2) having transversely mounted thereon axles 2 (FIGS. 1, 2 and 3). The axles pivotally support thereon bell cranks 3 (FIGS. 1 and 3), each having one extremity thereof pivotally connected through a rod 4 (FIG. 1) with an air cylinder 5 effecting rotation of the bell cranks 3 about the axles 2. The body of the air cylinder 5 is pivotally mounted on the base structure 1. The bell cranks 3 carry on the other extremities thereof axles 6 (FIGS. 1, 2 and 3) on the opposite ends of which there are mounted eccentric studs 7 (FIGS. 2 and 3). The studs 7 receive thereabout bearings 8 (FIGS. 1 and 2) supporting thereon a table 9 (FIGS. 1, 2 and 4) adapted to accommodate thereon a glass sheet from which a blank is to be cut out. To render the table support structure more rigid, the axle 2 are additionally connected with the table-supporting axles 6 through auxiliary rods 10 (FIG. 3).

The above described mounting of the table 9 provides for its longitudinal motion relative to the base structure 1, as well as for its raising and lowering. It can be seen that raising and lowering of the table 9 is effected by the air cylinder 5.

Longitudinal reciprocation of the table 9 is effected by a double-action air cylinder 11 (FIG. 1) having one end thereof pivotally associated with the axle 6 and the other end thereof pivotally connected with the table 9.

The air cylinder 11 (FIG. 1) is fed with compressed air from a compressed-air source (not shown) through a solenoid-actuated valve 12 (FIGS. 1 and 4), whereby the cylinder is energized for a driving effort in either one of two opposite directions. The operation of the solenoid-actuated valve 12 will be described hereinbelow.

The base structure 1 has mounted thereon a plate 13 (FIGS. 1 and 2) overlying the table 9 and supporting thereon a template 14 (FIGS. 1, 2 and 4) of which the outline in a plan view is equidistant from the contour of a shape to be cut out.

Followers 15 engage the template 14 and support therebetween a cutting head 16 movable along the template 14 by means of a drive 17 (FIGS. 1 and 2) from which motion is transmitted to the cutting head through a driving chain 18 running about a driving sprocket 19 (FIG. 2) mounted on the output shaft of the drive 17.

There is mounted on the base structure 1 adajcent to one of the two parallel sides 20 (FIG. 4) of the template 14 a pickup 21 (FIG. 4) responsive to the position of the cutting head 16 with respect to the outline of the template 14. In the presently described embodiment the pickup 21 is in the form of a contactless limit switch. It has been found convient to perform the operation of cutting out blanks with their alternating elongation and curtailing by means of the herein disclosed apparatus, with the pickup 21 being mounted at the middle of one of the sides of the template 14, i.e. in a position indicated in FIG. 4 with the letter A. The pickup 21 is connected through a flip-flop circuit 22 with a binary input, amplifiers 23 and auxiliary relays 24 with the solenoids 25 and 26 of the solenoid-actuated valve 12.

The abovedescribed electric and mechanic system constitutes an embodiment of the means defined in the Claims to follow as means for alternating energization of the drive, i.e. of the air cylinder 11 for effecting forward and reverse longitudinal motion of the table with respect to the parallel sides of the template. It is obvious that this is by far not the only possible embodiment of this means.

Thus, depending on the actual starting point of the succession of the blanks, it may be more convenient to have two pickups mounted, respectively, at the two parallel sides of the template.

The herein disclosed apparatus provides for cutting out alternatingly curtailed and elongated glass sheet blanks which are subsequently superimposed in pairs, according to the technological pattern of production of panoramic windows for automotive vehicles.

Cutting out of the blanks is performed by the herein disclosed apparatus, as follows.

The initial position of the table 9, i.e. the position prior to a glass sheet being laid thereon is its bottommost position whereat driven feed rollers 27 (FIG. 1) also included in the apparatus to feed successive glass sheets onto the table 9 to underlie the template 14 are situated above the lowered table 9. As the rollers 27 feed a glass sheet 28 (FIGS. 1 and 2) to underlie the template 14, a known per se system energizes the air cylinder 5 for the latter to rotate the bell cranks 3 in a direction corresponding to raising of the axles 6 and, consequently, of the table 9 into the topmost position whereat the table 9 is above the level of the feed rollers 27. In this position the glass sheet 28 is supported by the table 9 and is brought into a firm contact with the cutting head 16 which has been previously driven into a position convenient for commencing of the cutting-out operation, i.e. at the middle of the other one 29 (FIG. 4) of the two parallel sides of the template 14, indicated with the letter B. Then the drive 17 is energized, its rotation being transmitted through the driving sprocket 19 and chain 18 to the cutting head 16 which starts rolling by means of the followers 15 along the template 14, whereby the glass sheet is scratched along the required contour. In the presently described embodiment the cutting head 16 rolls from the position B (FIG. 4) in a direction indicated with the arrow line C.

As the cutting head 16 rolls into the position A at the respective one 20 of the two parallel sides of the template, where the pickup 21 is situated, the projection 30 provided on the head 16 enters the groove 31 provided in the housing of the pickup 21, whereby the latter generates a signal sent to the flip-flop circuit 22 with a binary input, wherefrom the signal is sent through either one of the two identical circuits made up by the respective amplifier 23 and auxiliary relay 24 to the respective solenoid 25 of the solenoid-actuated air feed control valve 12, which is switched to feed compressed air into that space of the air cylinder 11, which corresponds to rotation of the axle 6 in the direction resulting in the table 9 with the glass sheet 28 supported thereby being displaced in the direction opposing that of the motion of the cutting head 16.

This amounts to relative displacement of the glass sheet and of the cutting head in opposing directions toward each other, i.e. to elongation of the path of the travel of the cutting head 16 and, consequently, to corresponding elongation of the blank being cut out.

The longitudinal displacement of the table 9 is effected through a distance equalling one half of the required difference between the lengths, respectively, of the elongated and curtailed blanks, the distance being defined by corresponding positioning of abutments 32 (FIG. 1) receivable in a slot 33 provided in the table 9. The abutments 32 are mounted on the axle 6 by means of an arm 34. As the axle 6 is rotated in a direction corresponding to the displacement of the table 9 toward the moving cutting head 16, the arm 34 is actuated in a direction opposing that of the displacement of the table. Consequently, the abutments 32 finally engage the respective wall of the slot 33, halting the displacement of the table 9.

The subsequent travel of the cutting head 16 along the template 14 is effected with the table 9 being stationary. As the cutting head 16 rolls along the template, its projection 30 leaves the groove 31 in the pickup 12, and the signal coming from the latter dies out, which is not followed by switching over of the air feed control valve 12.

The abovedescribed operation of cutting out an elongated blank ends upon the cutting head 16 returning into the initial position B.

At this position of the cutting head 16 the latter stops in a manner known per se, the table 9 is lowered by the action of the air cylinder 5 into its bottommost position, whereby the glass sheet 28 rests on the feed rollers 27 which latter subsequently drive it away from under the template 14.

The successive operation of cutting out a curtailed blank is performed similar to the one described hereinabove, with the difference that the signal coming from the pickup 21 is sent to the solenoid 26 of the air feed control solenoid-actuated valve 12, which turns on the feed of compressed air into the other space of the air cylinder 11, whereby the axle 6 is rotated in a direction opposite to that described hereinabove, which corresponds to the displacement of the table 9 in the direction coinciding with that of the travel of the cutting head 16. The extent of this displacement is the same as that corresponding to cutting out of an elongated blank, i.e. equalling one half of the difference between the lengths, respectively, of an elongated blank and of a curtailed one. The extent of the displacement of the table 9 is adjustable by either projection or retraction of the abutments 33 which are threadedly secured in the arm 34. This adjustment of the value of the displacement of the table 9 amounts to adjustment of the degree of elongation and curtailing of the blanks being alternatingly cut out.

What we claim is:

1. In a glass cutting apparatus of the type having a table for supporting a glass sheet to be cut; an endless template disposed above said table and defining the shape of a blank to be cut from the glass sheet supported on said table, said template having a pair of parallel sides defining a longitudinal dimension of the glass blank to be cut; a driven glass cutter cooperative with said template and having a path of travel along said template for cutting the glass blank from the glass sheet; means operable for raising said table to a position where the glass cutter can cut the glass sheet supported on said table and for lowering said table away from said glass cutter; and means for displacing said table relative to said template and said glass cutter, and in a direction of the longitudinal dimension defined by the pair of parallel sides of said template, thereby to vary the length of the longitudinal dimension of the glass blank; the improvement which comprises:

said means for displacing said table comprising a control system responsive to the position of said glass cutter along said template for effecting a displacement of said table during the course of cutting a glass blank, wherein the displacements during successive cuttings of glass blanks are alternately in opposite directions along the longitudinal dimension defined by the two parallel sides of said template, the displacement of said table occurring during each of the successive cuttings after said glass cutter has traveled from one to the other of the two parallel sides of said template, thereby to render alternate ones of the glass blanks successively longer and shorter than the length defined by said template; and means for limiting the displacement of said table in the opposite directions to equal distances, whereby the average of the longitudinal dimensions of a pair of successive glass blanks is equal to the longitudinal dimension of said template.

2. In a glass cutting apparatus according to claim 1, wherein said control system comprises: a pickup disposed along one of the parallel sides of said template and coactive with said glass cutter for developing an output signal when said glass cutter is adjacent thereto; and flip-flop receptive of the pickup output signal for alternately developing one of two flip-flop output signals each time said glass cutter is adjacent said pickup; and wherein said means for displacing said table is responsive to said flip-flop output signals for displacing said table in one of the opposite directions according to which of said flip-flop output signals is developed.

3. In a glass cutting apparatus according to claim 1, wherein said means for limiting the displacement of said table comprises: means defining an elongated slot within said table and extending along the direction of displacement of said table; and an arm extending into said slot to limit the displacement of said table, said arm mounted to pivot along the direction of displacement of said table thereby to control the limits of the displacement of said table.

* * * * *